(12) United States Patent
Minemura et al.

(10) Patent No.: US 6,648,995 B2
(45) Date of Patent: Nov. 18, 2003

(54) METHOD OF QUENCHING WORKPIECE WITH HOLE, ASSISTIVE TOOL FOR USE IN QUENCHING, AND CRANKSHAFT

(75) Inventors: Kazuo Minemura, Tochigi-ken (JP); Noriyuki Okutsu, Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/875,078

(22) Filed: Jun. 7, 2001

(65) Prior Publication Data

US 2001/0049977 A1 Dec. 13, 2001

(30) Foreign Application Priority Data

Jun. 7, 2000 (JP) .......................... 2000-171163

(51) Int. Cl.⁷ ................................. C21D 9/30
(52) U.S. Cl. .................. 148/571; 148/572; 148/904
(58) Field of Search ............... 148/571, 572, 148/904

(56) References Cited

U.S. PATENT DOCUMENTS

| | | |
|---|---|---|
| 2,299,934 A | 10/1942 | Sherman et al. |
| 4,531,036 A | 7/1985 | Lewis |
| 5,935,009 A | 8/1999 | Hosdez et al. |
| 6,048,417 A * | 4/2000 | Pond ........................ 148/571 |

FOREIGN PATENT DOCUMENTS

| | | |
|---|---|---|
| DE | 1134 405 | 8/1962 |
| DE | 39 26 571 C1 | 4/1990 |
| DE | 198 34 142 A1 | 2/2000 |
| FR | 2 752 890 | 8/1996 |
| GB | 1 219 364 | 1/1971 |
| GB | 1 593 373 | 7/1981 |
| JP | 60-88214 | 5/1985 |
| JP | 2-120506 | 5/1990 |
| JP | 4-141522 | 5/1992 |
| JP | 8-53708 A | 2/1996 |
| JP | A914252 | 1/1997 |
| WO | WO 88/09106 | 11/1988 |

OTHER PUBLICATIONS

Patent Abstracts of Japan; No. 09014252 A; Jan. 14, 1997; Uchikura Masashi; "Crankshaft and Hardening Method Thereof".

* cited by examiner

*Primary Examiner*—Sikyin Ip
(74) *Attorney, Agent, or Firm*—Birch, Stewart, Kolasch & Birch, LLP (57) ABSTRACT

A ferrite core partly covered with ceramics members is loaded into an oil hole defined in a pin, and high-frequency induction hardening is effected on the pin while the ferrite core is being held in position by copper wires. At the same time, a magnetic field is generated from the ferrite core to produce a high-frequency induction hardened layer having progressively spreading skirt regions extending from a position in the vicinity of a center in an axial direction of the oil hole toward openings in ends of the oil hole.

7 Claims, 7 Drawing Sheets

METHOD OF QUENCHING WORKPIECE WITH HOLE, ASSISTIVE TOOL FOR USE IN QUENCHING, AND CRANKSHAFT

BACKGROUND OF THE INVENTION

1. Field of the Invention

The present invention relates to a method of quenching a workpiece with a hole, such as a crankshaft for use in internal combustion engines, to harden the workpiece, an assistive tool for use in quenching such a workpiece, and a crankshaft.

2. Description of the Related Art

Internal combustion engines for use on motor vehicles have a crankshaft that is connected to pistons by connecting rods. The crankshaft comprises a plurality of pins, a plurality of journals, and a plurality of counterbalances. The journals are rototably supported by respective shanks, and the connecting rods are rotatably coupled to the pins, respectively. The journals and the pins have oil holes defined therein for the passage of lubricating oil. The oil holes provide a lubricating oil passage for supplying part of the lubricating oil from bearings to the pins and the journals to lubricate bearing shells in the connecting rods.

The pins and the journals are case-hardened by high-frequency induction hardening in order to increase the surface hardness thereof.

One problem of the crankshaft is that because of the lubricating oil passage, the pins which are positioned out of alignment with the journals tend to have their torsional fatigue strength reduced.

The problem may be solved by effecting high-frequency induction hardening on the pins and the journals and regions around the oil holes under different conditions to produce a deeper hardened layer in the regions around the oil holes.

There is also known a technical approach to increase the fatigue strength of a crankshaft near openings of a lubricating oil passage defined therein by effecting high-frequency induction hardening on the surface of the crankshaft which includes the openings of the lubricating oil passage and then effecting laser beam quenching or shot peening on surface regions in the openings beneath the hardened layer that has been produced by the high-frequency induction hardening (see Japanese laid-open patent publication No. 9-14252).

The former solution, i.e., subjecting the pins and the journals and the regions around the oil holes to high-frequency induction hardening under different conditions, is disadvantageous in that the production efficiency is low and the heating coil used for high-frequency induction hardening has its service life greatly reduced, tending to cause increased strains in the crankshaft.

The latter solution, i.e., the approach disclosed in Japanese laid-open patent publication No. 9-14252, is also problematic in that since a laser beam quenching device is required in addition to the high-frequency induction hardening device, it results in added investments in the production facility, which tend to increase the manufacturing cost of the crankshaft, and it is also apt to greatly lower the production efficiency.

SUMMARY OF THE INVENTION

It is a general object of the present invention to provide a method of quenching a workpiece with a hole to produce a quenched hardened layer on the outer surface of a workpiece and simultaneously produce a quenched hardened layer in the hole including an opening thereof.

A major object of the present invention is to provide an assistive tool which is capable of easily producing a quenched hardened layer in a hole defined in a workpiece.

Another object of the present invention is to provide a crankshaft which has a desired hardened layer produced by high-frequency induction hardening entirely or partly in an oil hole defined in the crankshaft, depending on the durability required of the crankshaft.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
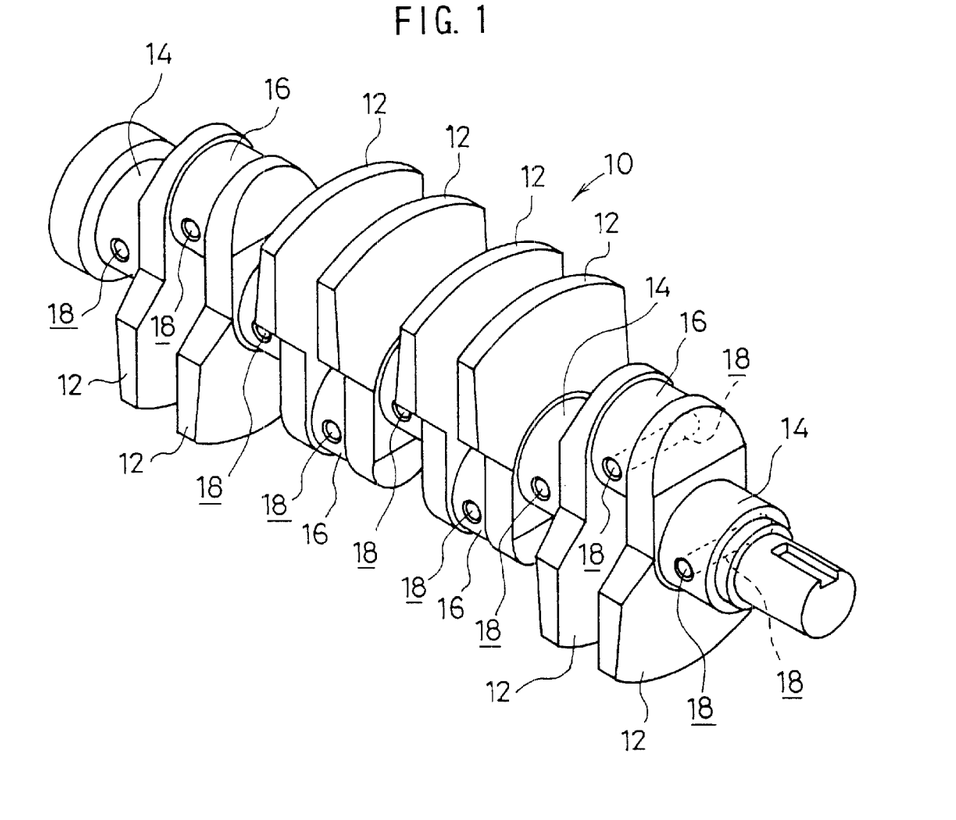
FIG. 1 is a perspective view of a crankshaft as a workpiece to which a method of quenching a workpiece with a hole according to the present invention is applied.

FIG. 1 shows a crankshaft 10 as a workpiece to which a method of quenching a workpiece with a hole according to the present invention is applied.

As shown in FIG. 1, the crankshaft 10 is made of a material of excellent hardenability such as high carbon steel, alloy steel, or the like, and is in the form of a forged product with a plurality of counterbalances 12 integrally formed therewith. The crankshaft 10 also has a plurality of axially spaced, large-diameter cylindrical journals 14 rotatably supported by respective bearings, and a plurality of axially spaced, small-diameter cylindrical pins 16 to which respective connecting rods, not shown, are rotatably coupled.

The journals 14 and the pins 16 have oil holes 18, functioning as a lubricating oil passage, defined therein substantially perpendicularly to the axis of the crankshaft 10. The oil holes 18 defined in the journals 14 and the oil holes 18 defined in the pins 16 communicate with each other via communication passageways, not shown. The lubricating oil passage also communicates with oil holes (not shown) defined in the counterbalances 12.

In the present embodiment, each of the oil holes 18 has a diameter of about 5.0 mm and has axially opposite openings 20 (see FIG. 2) defined by beveled edges. The oil holes 18 are formed by a drill or the like, not shown, before the surface of the crankshaft is processed by high-frequency induction hardening.

Prior to high-frequency induction hardening, an assistive tool 22 for quenching is loaded into each of the oil holes 18.

Figure 2:
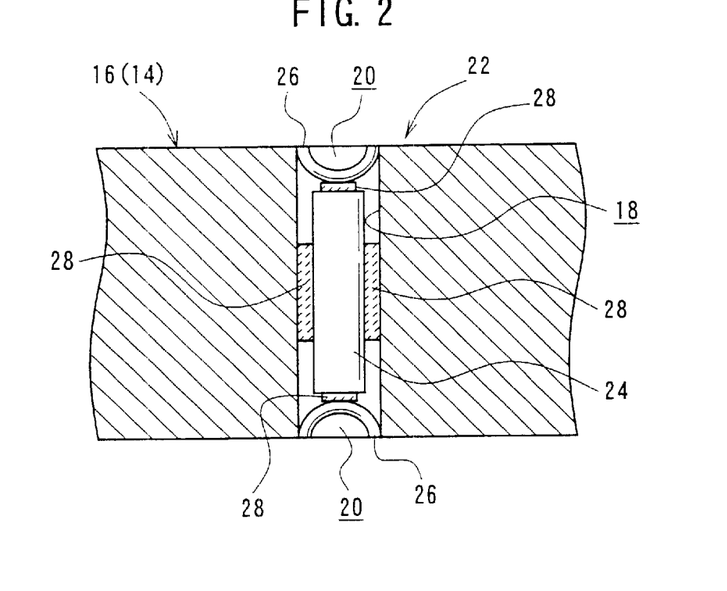
FIG. 2 is a fragmentary vertical cross-sectional view of the crankshaft with an assistive tool for quenching being inserted in an oil hole defined in a pin of the crankshaft.

As shown in FIG. 2, the assistive tool 22 comprises a ferrite core 24 which is substantially in the form of a cylinder that can be inserted into the oil hole 18 and functions as a magnetic core made of a heat-resistant magnetic material, copper wires 26 made of an electrically conductive material which function as holder members positioned on the axially opposite ends of the ferrite core 24 for holding the ferrite core 24 within the oil hole 18, and ceramics members 28 made of a heat-resistant insulating material and functioning as spacers disposed between the outer circumferential surface of the ferrite core 24 and the inner wall surface of the oil hole 18 and between the axially opposite ends of the ferrite core 24 and the copper wires 26.

In the present embodiment, the ferrite core 24 has a diameter of about 3.5 mm and a length of about 20.0 mm, and is in the form of a cylinder machined from a solid blank. The ferrite core 24 has certain areas covered with the ceramics members 28 and is loosely fitted in the oil hole 18. The ferrite core 24 may be replaced with an inductive material of excellent electric conductivity and magnetic permeability, such as silicon steel sheet or the like.

The ceramics members 28 may be made of a heat-resistant insulating material such as alumina fiber or the like, and may have a thickness ranging from about 0.2 mm to 0.5 mm. In the present embodiment, the ceramics members 28 are in the form of thin, slender plates having a thickness of about 0.3 mm and applied to the outer circumferential surface of the ferrite core 24 at given spaced intervals in the shape of irregularly scattered spots, or crisscross or matrix patterns.

The holder members are made of an electrically conductive material supporting the ferrite core 24, and are arranged so as to be easily pushed into and removed from the oil hole 18. In the present embodiment, each of the holder members comprises a single copper wire 26 curved into an arcuate shape and engaging in an inlet end of the oil hole 18 to allow the oil hole 18 to communicate with the exterior without closing the oil hole 18.

Figure 4:
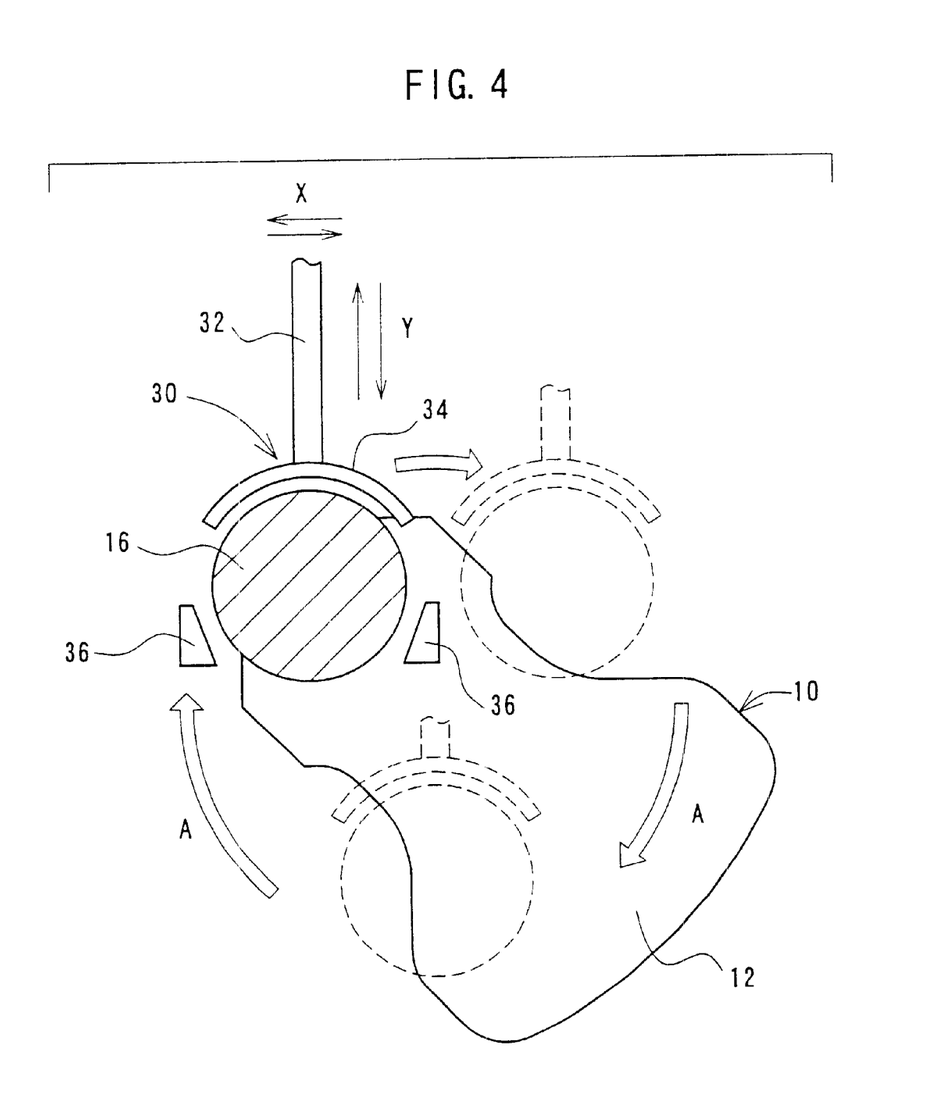
FIG. 4 is an elevational view, partly in cross section, of a high-frequency induction heating coil for performing high-frequency induction heating on the pin.

After the assistive tool 22 is loaded in each of the oil holes 18, a semi-loop saddle-shaped high-frequency induction heating coil 30 shown in FIG. 4 is used to effect high-frequency induction hardening on the pins 16 or the journals 14 while the crankshaft 10 is being rotated in the direction indicated by the arrow A.

The high-frequency induction heating coil 30 comprises a lead pipe 32 that is displaceable in the direction indicated by the arrow X or Y by an actuator, not shown, an arcuate heating conductor 34 displaceable in unison with the lead pipe 32 and energizable by a high-frequency power supply, not shown, and coolant jackets 36 for ejecting a coolant to quench the hardened surface of the crankshaft 10.

A process of effecting high-frequency induction hardening on the pins 16 of the crankshaft 10 will be described below.

When the high-frequency induction heating coil 30 is energized to heat the outer circumferential surface of each of the pins 16 by way of induction heating, the ferrite core 24 loaded in the oil hole 18 produces a magnetic field, increasing the temperature of a region extending from the center O of the oil hole 18 to the opposite openings 20 due to induction heating. As a result, as shown in FIG. 3, a high-frequency induction hardened layer 40, indicated as a hatched area in FIG. 3, is produced which has progressively spreading skirt regions 38 extending from the center O of the oil hole 18 to the opposite openings 20.

After the pin 16 is heated by the high-frequency induction heating coil 30, a coolant is ejected from the coolant jackets 36 to the hardened surface and the oil hole 18 to quench the pin 16 including the oil hole 18.

In the vicinity of the openings 20 of the oil hole 18, there is partly produced a high-frequency induction hardened layer having a thickness ranging from about 8.0 mm to 10.0 mm, which is about twice the ordinary thickness of such a high-frequency induction hardened layer, resulting in the high-frequency induction hardened layer 40 which has the skirt regions 38 extending from the center O of the oil hole 18 to the opposite openings 20. The high-frequency induction hardened layer 40 is effective in greatly increasing the mechanical strength of the pin 16 against loads.

Figure 3:
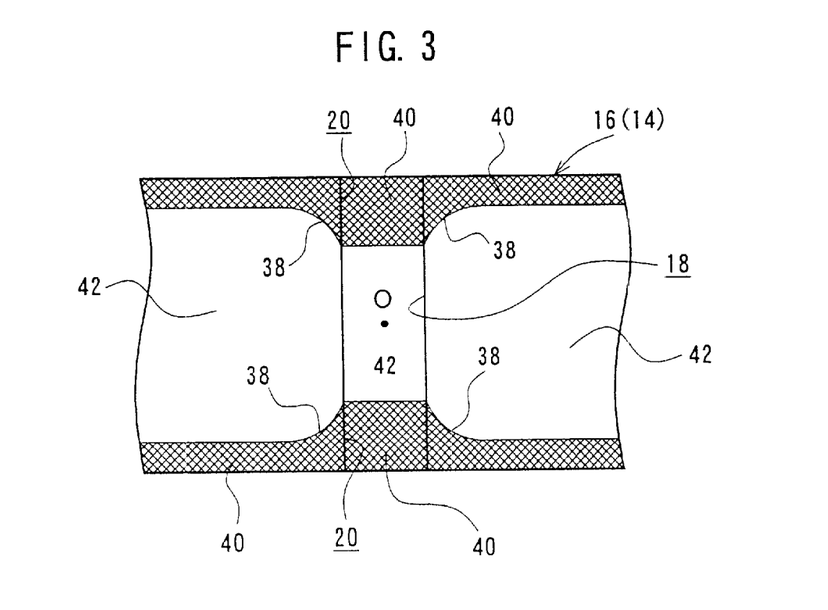
FIG. 3 is a fragmentary cross-sectional view showing a hardened layer produced by high-frequency induction hardening in the oil hole in the pin.

As shown in FIG. 3, in the vicinity of the center O of the oil hole 18, there is produced a non-hardened layer 42, indicated as a blank area in FIG. 3 which is not high-frequency-induction-hardened because no high-frequency induction heating occurs therein. It can thus be seen that the high-frequency induction hardened layer 40 is progressively spread from positions that are spaced from the center O toward the openings 20 toward the openings 20.

As a consequence, the pins 16 achieves a desired torsional fatigue strength without adversely affecting the toughness therein. The same high-frequency induction hardened layer 40 may be produced in each of the journals 14 in the same manner as with the pins 16.

Preferably, the heat-resistant ferrite core 24 loaded in the oil hole 18 should not be tightly packed in the oil hole 18, but should be loosely fitted in the oil hole 18.

The holder members should be of such a shape that they can easily be pushed into and removed from the openings 20 of the oil hole 18, and should preferably be recycled in use. It is necessary that the holder members do not completely close off the oil hole 18, but should be of an open structure to allow air to be discharged from the oil hole 18 for a quenching effect. Such an open structure is needed to allow the coolant to flow smoothly into the oil hole 18 because the workpiece, i.e., the pins 16 and the journals 14 of the crankshaft 10, which has been heated by high-frequency induction heating, is quenched into a martensitic structure by the coolant.

Figure 5:
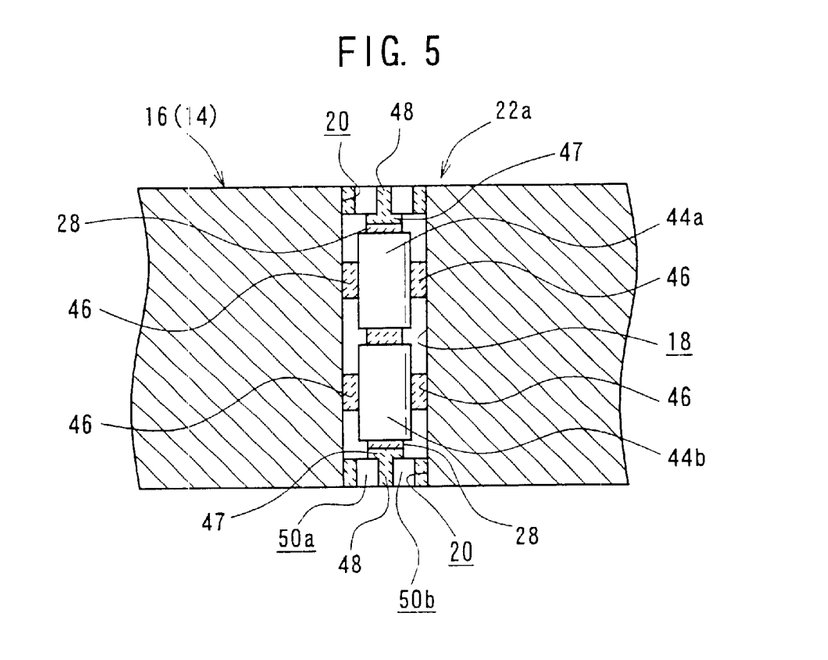
FIG. 5 is a fragmentary vertical cross-sectional view of a crankshaft with an assistive tool for quenching according to a first modification being inserted in an oil hole defined in a pin of the crankshaft.

FIG. 5 shows an assistive tool 22a for quenching according to a first modification of the present invention. Those parts of modified assistive tools, described below, which are identical to those of the assistive tool according to the above embodiment are denoted by identical reference characters, and will not be described in detail below.

Figure 7:
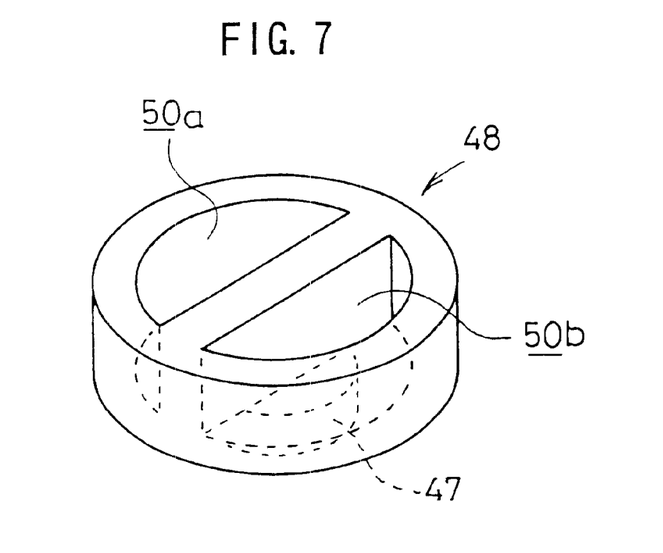
FIG. 7 is a perspective view of a holder member of the assistive tool shown in FIG. 5.
Figure 8:
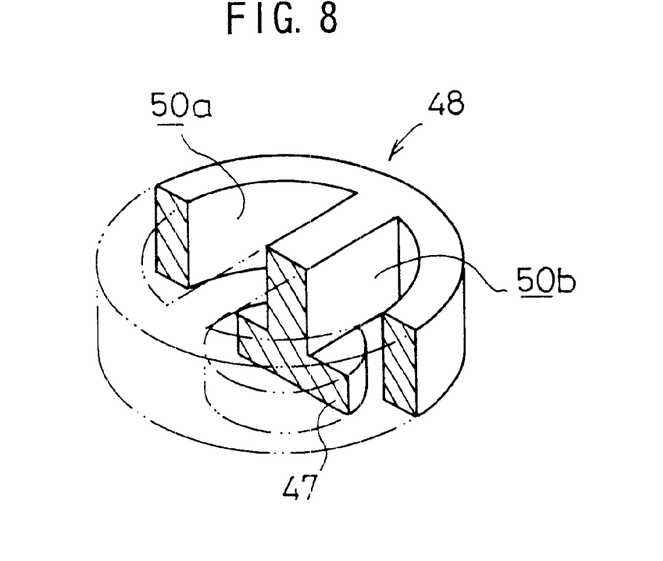
FIG. 8 is a cross-sectional view, taken along a diametrical line, of the holder member shown in FIG. 7.

According to the first modification, two axially separate ferrite cores 44a, 44b are inserted axially into the oil hole 18, and a plurality of ceramics members 46 functioning as spacers are interposed between the ferrite cores 44a, 44b and also between the ferrite cores 44a, 44b and the inner circumferential surface of the oil hole 18. As shown in FIGS. 7 and 8, other disk-shaped holder members 48 each having a cylindrical projection 47 are disposed in the respective openings 20 of the oil hole 18. Each of the holder members 48 has a pair of diametrically opposite crescent-shaped through holes 50a, 50b defined therein. The holder members 48 should preferably be made of an electrically conductive material. The ferrite cores 44a, 44b are held in the oil hole 18 by the ceramics members 46, the holder members 48, and the holder members 28.

Figure 6:
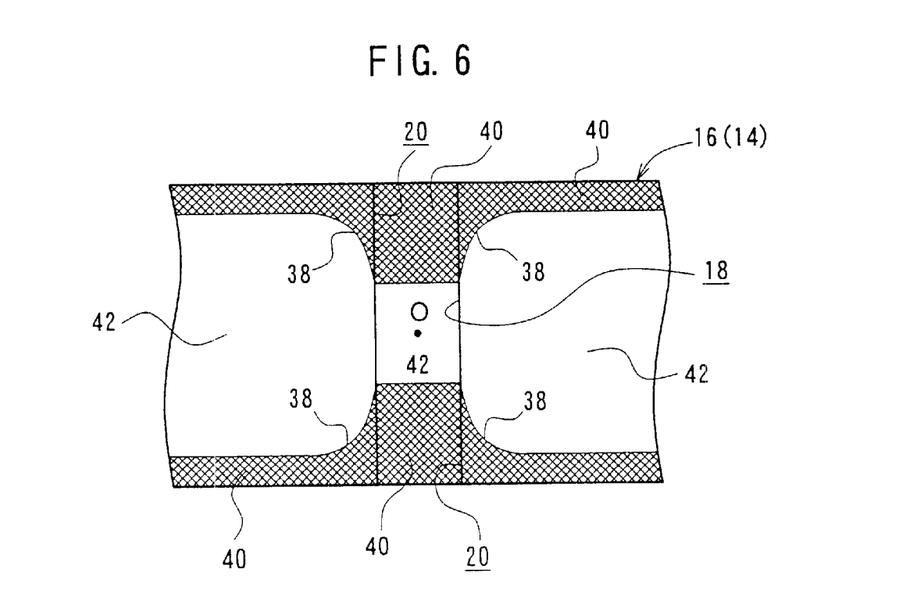
FIG. 6 is a fragmentary cross-sectional view showing a hardened layer produced by high-frequency induction hardening in the oil hole in the pin, using the assistive tool shown in FIG. 5.

When a high-frequency induction hardening process is carried out on the pins 16 and the journals 14 using the assistive tool 22a according to the first embodiment, there is produced a high-frequency induction hardened layer 40 which has progressively spread skirt regions 38 extending from the center O of the oil hole 18 to the opposite openings 20, as shown in FIG. 6.

Figure 9:
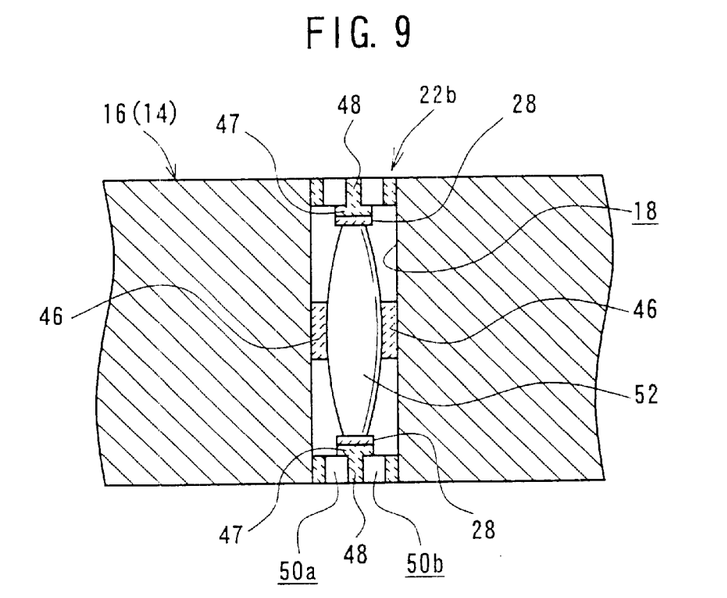
FIG. 9 is a fragmentary vertical cross-sectional view of a crankshaft with an assistive tool for quenching according to a second modification being inserted in an oil hole defined in a pin of the crankshaft.

FIG. 9 shows an assistive tool 22b for quenching according to a second modification of the present invention.

Figure 10:
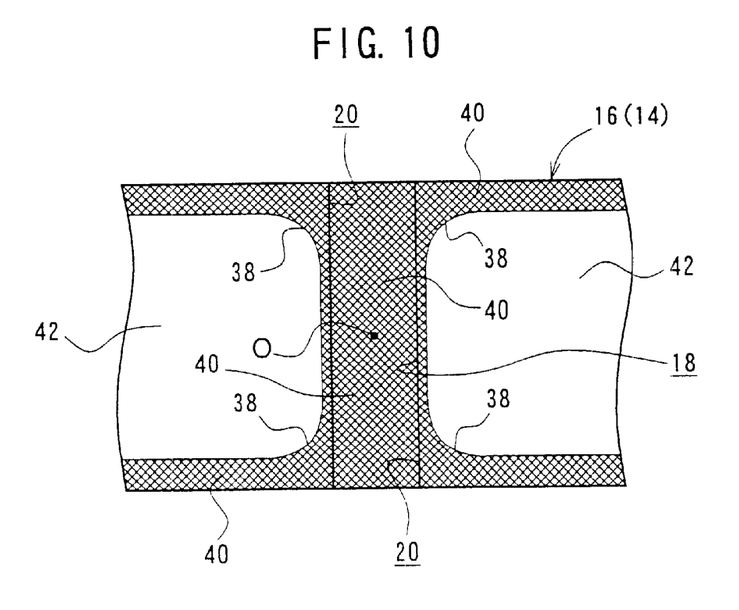
FIG. 10 is a fragmentary cross-sectional view showing a hardened layer produced by high-frequency induction hardening in the oil hole in the pin, using the assistive tool shown in FIG. 9.

According to the second modification, the assistive tool 22b has a barrel-shaped ferrite core 52 whose thickness is maximum at its center and is progressively reduced toward its opposite ends. When a high-frequency induction hardening process is carried out on the pins 16 and the journals 14 using the assistive tool 22b according to the second embodiment, there is produced a high-frequency induction hardened layer 40 which extends in and between the opposite ends 20 across and in the vicinity of the center O of the oil hole 18 as shown in FIG. 10.

Some crankshafts for use in high-load, high-output internal combustion engines on racing cars and sports cars are required to have a high torsional strength and a high overall mechanical strength. On such crankshafts, it is desirable to have the high-frequency induction hardened layer 40 entirely in the oil hole 18. It is preferable to use the assistive tool 22b according to the second embodiment to produce such crankshafts.

On crankshafts for general use, however, it is not necessary to provide the high-frequency induction hardened layer 40 entirely in the oil hole 18, and a sufficient torsional strength can be achieved by the high-frequency induction hardened layer 40 which is progressively spread from positions that are spaced from the center O toward the openings 20 toward the openings 20.

By selecting a suitable one of the assistive tools according to the present invention, it is possible to produce the high-frequency induction hardened layer 40 entire or partly in the oil hole 18 depending on the durability strength required of the crankshaft to be fabricated. Therefore, various crankshafts having different durability strengths can be manufactured using the different assistive tools according to the present invention.

Figure 11:
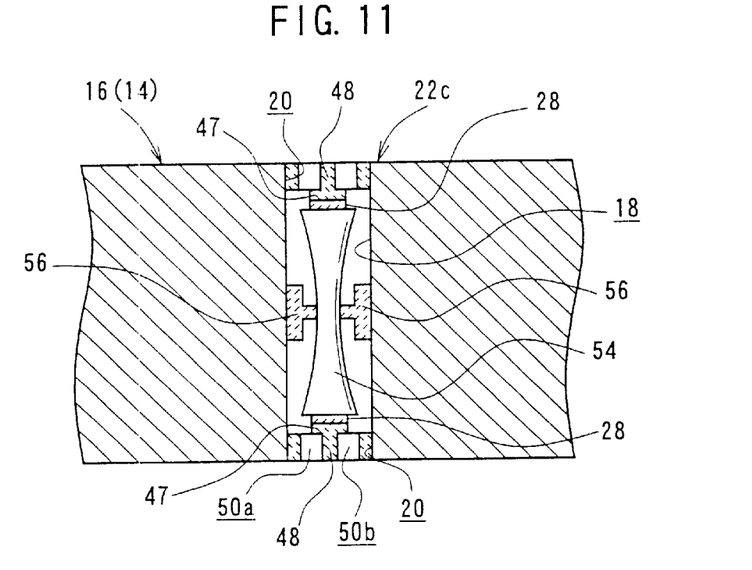
FIG. 11 is a fragmentary vertical cross-sectional view of a crankshaft with an assistive tool for quenching according to a third modification being inserted in an oil hole defined in a pin of the crankshaft.
Figure 12:
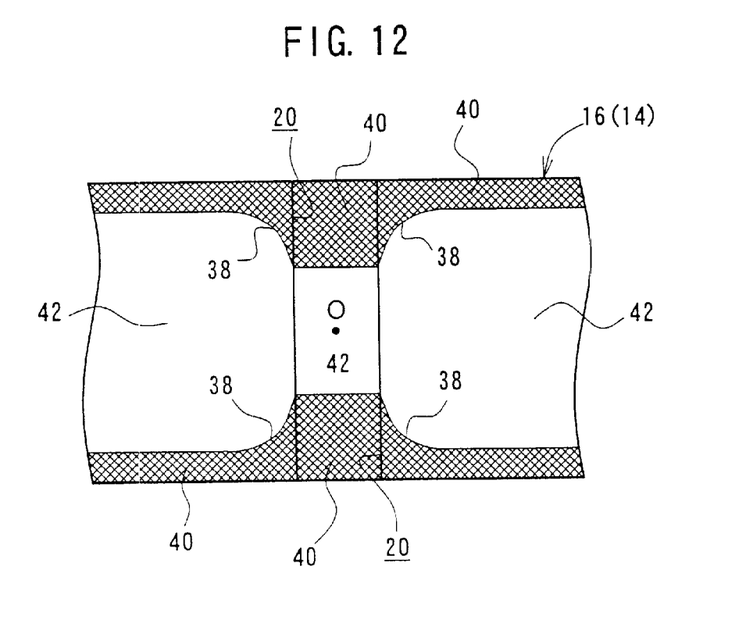
FIG. 12 is a fragmentary cross-sectional view showing a hardened layer produced by high-frequency induction hardening in the oil hole in the pin, using the assistive tool shown in FIG. 11.

As shown in FIG. 11, an assistive tool 22c for quenching according to a third modification of the present invention has a pin-cushion-shaped ferrite core 54 whose thickness is minimum at its center. The ferrite core 54 is held in the oil hole 18 by ceramics members 56 of T-shaped cross section in addition to the holder members 48, 28. When a high-frequency induction hardening process is carried out on the pins 16 and the journals 14 using the assistive tool 22c according to the third embodiment, there is produced a high-frequency induction hardened layer 40 which is identical to the high-frequency induction hardened layer 40 shown in FIG. 3, as shown in FIG. 12.

Although certain preferred embodiments of the present invention have been shown and described in detail, it should be understood that various changes and modifications may be made therein without departing from the scope of the appended claims.

What is claimed is:

1. A method of hardening a workpiece having a hole, comprising the steps of:
   loading an inductive member covered with an electrically insulating member into a hole defined in a workpiece;
   effecting high-frequency induction hardening on the workpiece while the inductive member is being held in position by a holder member made of an electrically conductive material which is disposed in an opening in an end of the hole;
   simultaneously, during application of said inducting hardening, generating a magnetic field from the inductive member loaded in the hole to produce a treated layer adjacent said hole, wherein a radial distance between an axial line of said hole and a surface of said treated layer progressively increases in an axial direction from a position inside of said hole toward openings in respective ends of the hole; and
   quenching said workpiece and said hole by cooling said treated layer to produce a hardened layer.

2. A method according to claim 1, wherein said inductive member comprises an integral cylindrical member, further comprising the step of producing a non-hardened layer at the center of the hole adjacent said hardened layer.

3. A method according to claim 1, wherein said inductive member comprises a pair of axially separate cylindrical members, further comprising the step of producing a non-hardened layer at the center of the hole adjacent said hardened layer.

4. A method according to claim 1, wherein said inductive member comprises a substantially cylindrically-shaped member having a surface that tapers inwardly toward the center of said substantially cylindrically-shaped member, further comprising the step of producing a non-hardened layer at the center of the hole adjacent said hardened layer.

5. A method according to claim 1, wherein said inductive member comprises a substantially cylindrically-shaped member having a surface that tapers outwardly toward the center of said substantially cylindrically-shaped member, further comprising the step of producing said hardened layer over an entire surface of said hole including the center thereof.

6. A method according to claim 1, wherein said inductive member comprises a ferrite core or a silicon steel sheet.

7. A method of hardening a crankshaft having a hole, comprising the steps of:
   inserting an inductive member covered with an electrically insulating member into a plurality of oil holes defined in each of at least pins and journals of a crankshaft such that the inductive member is loosely fitted in the oil hole;
   effecting induction hardening on each of at least the pins and the journals while said inductive member is being held in said oil hole by a holder member of an electrically conductive material which engages in an opening of said oil hole, thereby producing a treated layer in said oil hole;
   quenching said workpiece and said hole by cooling said treated layer to produce a hardened layer; and
   removing said inductive member, said electrically insulating member, and said holder member from said oil hole.

* * * * *